June 7, 1960

J. M. DANIEL 2,939,213

INSERTIBLE BLADE SCISSORS

Filed Oct. 13, 1958

INVENTOR
John M. Daniel
BY
Wooster Davis
ATTORNEYS.

United States Patent Office 2,939,213
Patented June 7, 1960

2,939,213

INSERTIBLE BLADE SCISSORS

John M. Daniel, 64 Denver St., Bridgeport, Conn.

Filed Oct. 13, 1958, Ser. No. 766,733

2 Claims. (Cl. 30—260)

This invention relates to insertible blade scissors, particularly to scissors of the type generally used by barbers, and has for an object to provide an improved means of removably securing the blades to the shanks of the handles of the scissors, and which, although firmly securing the blades to the handles during use of the scissors, will permit removal of the blades by merely a sufficient longitudinal pull outwardly on the blades, without requiring release of the pivotal connection between the blades.

Another object is to provide an improved shape for the shanks of the handles of the scissors used with these detachable blades, which will provide a more effective and more comfortable position of the fingers of the operator when using the scissors.

With the foregoing and other objects in view, I have devised the construction shown in the accompanying drawing forming a part of this specification. It is, however, to be understood the invention is not limited to the specific details of construction and arrangement shown, but may embody various changes and modifications within the scope of the invention.

Figure 1:
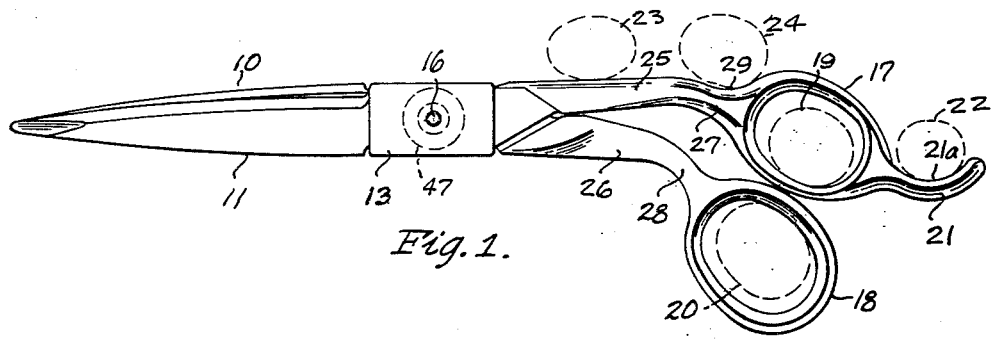
Fig. 1 is a side view of my improved scissors.
Figure 2:
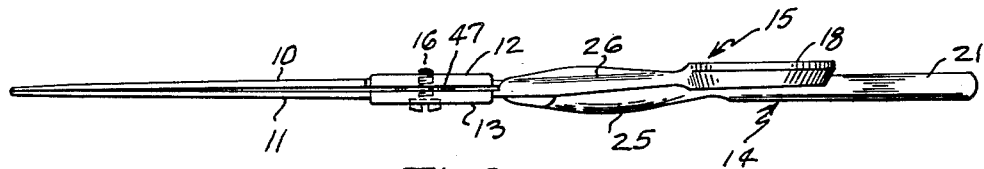
Fig. 2 is a bottom view thereof.
Figure 3:
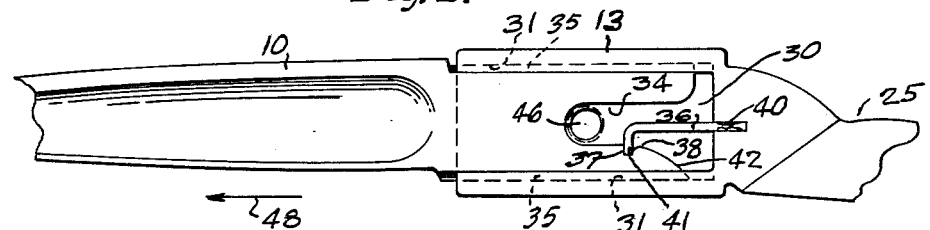
Fig. 3 is a side view on a larger scale looking toward the inner side of a portion of the shank and the attached end of the blade.
Figure 4:
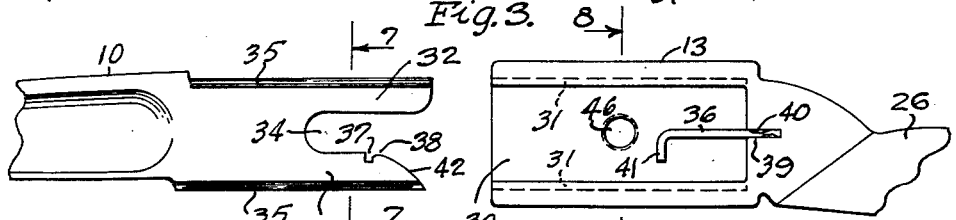
Fig. 4 is a side view of the end of the blade removed from the handle.
Figure 5:
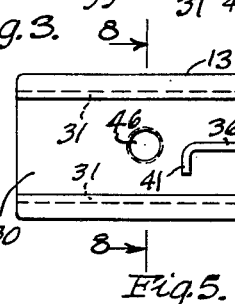
Fig. 5 is a side view of the shank of a handle with the blade removed.
Figure 6:
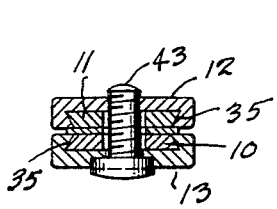
Fig. 6 is a transverse section through the scissors at the plane of the pivot screw.
Figure 7:
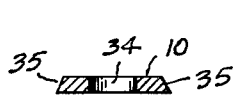
Fig. 7 is a transverse section substantially on line 7—7 of Fig. 4.
Figure 8:
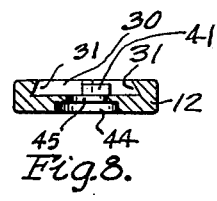
Fig. 8 is a transverse section of the shank opposite to that shown in Fig. 5, but on the plane of the line 8—8 of Fig. 5.

The scissors comprise a pair of blades 10 and 11 removably secured to the shanks 12 and 13 of handles 14 and 15 arranged side by side in overlapped relation and pivotally connected by a suitable pivot, such, for example, as a screw 16. The handles include finger loops 17 and 18, loop 17 being for the third finger of the right hand, indicated in dotted lines at 19, while the loop 18 is for the thumb, indicated in dotted lines 20. At the outer end of the loop 17 is a curved rest 21 concavely curved in its top surface to provide a seat 21a for the little finger indicated at 22, and the first finger 23 and second finger 24 rest on the connecting portion 25 of the shank extending between the portion 13 and the loop 17, while a similar connecting portion 26 connects the portion 13 of the lower shank to the loop 18. To permit a more comfortable position of the finger, as indicated, and a more effective position of the scissors in use, the connecting portion 25 of the shank to the loop 17 is curved downwardly, as indicated at 27 adjacent the loop 17, while the connecting portion 26 of the shank of the loop 18 is similarly curved downwardly, as indicated at 28. This provides a concavely curved recess or seat 29 for the second finger 24 at the top of the shank adjacent the loop 17, while the first finger 23 may rest on top of the shank 25 just forwardly thereof.

The improved means of removably securing the scissor blades to the handles or shanks thereof comprises thickened widened portions 12 and 13 at the free ends of the shanks. Each of these widened portions is provided with a recess or socket 30 extending longitudinally inward from the free end thereof and open at the inner side of the shank. At the opposite longitudinal edges of this recess or socket it is bevelled or tapered from the bottom outwardly, as indicated at 31. This therefore provides a dovetail socket 30 extending inwardly and longitudinally from the free end of the shank.

The inner end of each blade is forked or bifurcated providing laterally spaced side portions 32 and 33 separated by a longitudinally extending slot 34, and the outer edges of the blades are bevelled, as indicated at 35, backwardly from the free inner ends of the blades. In one edge of the slot 34 the blade is provided with holding means adapted to cooperate with a spring catch 36 mounted in the socket or recess 30 in the shank. In the arrangement shown this comprises a notch 37 spaced inwardly from the free end of the slot and comprising a curved edge 38 at the outer side of the entrance to the notch. The spring catch 36 is secured to the shank by any suitable means, such as mounting one end in a notch 39 in the shank and securing it by spot welding 40. At its free end it is provided with a laterally extending end portion 41 adapted to seat in the notch 37 to retain the blade in the shank. The edge of the shank having the notch 37 may be curved, as indicated at 42, to guide the end 41 of the spring to this notch when the bevelled end of the blade is inserted in the socket. The blades are pivoted together by a pivot, in this case comprising a screw 43, the outer surface of one shank, in this case the shank 13, being countersunk, as shown at 44, to receive the head of the screw, the threaded shank of which passes through the opening 45, and the other shank 12 is provided with a threaded opening 46 in which the screw is threaded with a tight thread connection to secure the two blades together. To provide smooth action between the blades a concave spring washer 47 may be provided between the blades and provided with an opening for passage of the pivot screw to provide the desired friction between the blades but permit free action.

With this construction the blade may be secured in the shank by merely inserting its bevelled free end longitudinally into the socket or recess 30 with its opposite bevelled edges 35 snugly fitting and guided by the bevelled or dovetail edges 31 of the socket, and the blade will be firmly held by the coaction of these dovetailed members. The notch 34 permits the inner free end of the blade to move past the pivot screw 43 with the portions 32 and 33 on opposite sides thereof, and therefore it is not necessary to remove the screw to mount the blades in the handles. As the blade is inserted the free end of the catch 36 seats in the notch 37 and holds the blade in the socket. However, the curved edge 38 at the outer side of the notch is so arranged and shaped that a given pull outwardly of the blades and longitudinally thereof, as indicated by the arrow 48, will cause this spring 36 to release, the curved edge 38 acting as a cam on the free end of the spring when the pull on the blade reaches a predetermined limit. However, during normal use of the scissors this free end 41 of the spring and the notch 37 are so shaped as to securely retain the blade in the shank during normal use of the scissors, and due to this slot 34 the blades may be removed from the shank without detaching or removing the pivot 43. Thus in order to remove either or both blades for sharpening, repair or renewal or any other reason, all that is necessary is to apply sufficient longitudinal pull outwardly on the blades, and they may be remounted and they may be re-attached to the handles by the simple operation of inserting their bevelled free inner ends into the dovetail sockets or recesses in the ends of the shanks of the handles.

Having thus set forth the nature of my invention, I claim:

1. Scissors comprising a pair of handles including overlapped shanks, a transverse pivot connecting said shanks, each of said shanks provided with a dovetail socket on its inner side extending longitudinally from the free end thereof opposite the handle including overhanging side edges provided with longitudinal tapered guide channels at the opposite side edges of the socket, a removable blade for each handle having an inner end portion beveled on its opposite side edges corresponding with the tapered guide channels to slide into a socket from the free end thereof and held thereby, the inner end of each blade bifurcated providing a slot extending longitudinally from its inner end and provided with a notch in one side edge of said slot, and a spring catch mounted in each socket provided with a free end seated in said notch to retain the blade in the socket, and said notch and catch provided with coacting surfaces shaped to provide a camming action to release the catch by a given longitudinal outward pull on the blade and permit removal of the blade from the socket while the shanks are connected by the pivot.

2. Scissors comprising a pair of overlapped handles each including an end portion provided with a dovetail socket on its inner side extending longitudinally inward from the free end thereof forming a blade holder including overhanging side edges provided with longitudinal tapered guide channels at the opposite sides edges of the socket, said end portions pivotally connected by a transverse pivot, a removable blade for each handle having an inner end portion beveled on its opposite side edges corresponding with the guide channels to slide into a socket from the free end thereof and be held thereby, said beveled end portion of each blade provided with a slot extending longitudinally inward from its free end and extending on opposite sides of the pivot, a spring catch mounted in each handle socket provided with a laterally extending free end, and each blade provided with a notch in one side edge of its slot into which said end of the spring may seat to retain the blade in the socket, the inner side edge of said notch being rounded forming means to force the spring from the notch to release the blade on a given outward pull applied to the blade and permit its removal from the socket while the blades are pivotally connected by the pivot.

References Cited in the file of this patent

UNITED STATES PATENTS

| | | |
|---|---|---|
| 106,649 | Barnard et al. | Aug. 23, 1870 |
| 347,878 | Kimbler et al. | Aug. 24, 1886 |
| 743,658 | Palkowski | Nov. 10, 1903 |
| 1,783,583 | Ralston | Dec. 2, 1930 |
| 1,940,855 | Friedman | Dec. 26, 1933 |
| 1,967,549 | Buda | July 24, 1934 |
| 2,725,629 | Todhunter | Dec. 6, 1955 |